US006722887B2

(12) United States Patent
Polonio

(10) Patent No.: US 6,722,887 B2
(45) Date of Patent: Apr. 20, 2004

(54) TRAINING AND/OR GAMING APPARATUS AND METHOD

(75) Inventor: Adrian Polonio, Princeton (CA)

(73) Assignee: Eagle's Flight, Creative Training Excellence Inc., Guelph (CA)

( * ) Notice: Subject to any disclaimer, the term of this patent is extended or adjusted under 35 U.S.C. 154(b) by 0 days.

(21) Appl. No.: 09/984,972

(22) Filed: Oct. 31, 2001

(65) Prior Publication Data

US 2003/0082506 A1 May 1, 2003

(51) Int. Cl.$^7$ .......................... G09B 19/00; A63H 29/10
(52) U.S. Cl. ...................... 434/237; 434/247; 446/176; 446/179; 273/366; 273/129 AP; 273/457
(58) Field of Search .................. 210/451; 273/366, 273/129 AP, 457; 446/168, 176, 179; 434/237, 236

(56) References Cited

U.S. PATENT DOCUMENTS

| | | | |
|---|---|---|---|
| 3,113,776 A | | 12/1963 | Romei |
| 3,302,949 A | * | 2/1967 | Wolfe .......................... 472/13 |
| 3,469,340 A | * | 9/1969 | Breneman et al. .......... 446/197 |
| 3,643,953 A | | 2/1972 | Fixler |
| 3,697,071 A | * | 10/1972 | Anderson ..................... 463/60 |
| 3,853,317 A | * | 12/1974 | Braunhut ..................... 273/457 |
| 4,014,543 A | | 3/1977 | Arad |
| 4,080,752 A | * | 3/1978 | Burge .......................... 446/89 |
| 4,136,872 A | | 1/1979 | Matsumoto |
| 4,142,725 A | | 3/1979 | Gilbert et al. |
| 4,250,657 A | | 2/1981 | Barlow et al. |
| 4,283,053 A | * | 8/1981 | Parker et al. ................. 463/64 |
| 4,468,029 A | | 8/1984 | Kulesza et al. |
| 4,725,256 A | | 2/1988 | Sassak |
| 5,360,164 A | * | 11/1994 | Pape et al. ..................... 239/88 |
| 5,385,472 A | * | 1/1995 | Mullin ........................ 434/126 |
| 5,480,336 A | * | 1/1996 | Blanchard ..................... 446/89 |
| 5,522,756 A | * | 6/1996 | Barthold ..................... 446/193 |

OTHER PUBLICATIONS

Kidnet program first used as early as Aug. 7, 2000.

* cited by examiner

Primary Examiner—Derris H. Banks
Assistant Examiner—Dmitry Suhol
(74) Attorney, Agent, or Firm—Bereskin & Parr

(57) ABSTRACT

This invention relates to an apparatus and method that can provide a group of individuals with an experiential exercise. The apparatus can comprise a source of fluid flow and a channel formation connected to the source of fluid flow at at least two regions of the channel formation. The source of fluid flow can be a vacuum suction provided from, for example, a single vacuum source. The fluid flow can be airflow. The channel formation is adapted to receive at least one projectile therein, and the projectile is displaceable within the channel formation as a result of the fluid flow. The projectile can be, for example, a ball. A gate is located at each region and is movable between an open position and a closed position. When the gate is in the closed position it at least partially obstructs the fluid flow with the channel formation in that region. Further, at least one fluid flow regulator is provided in the channel formation to adjust the fluid flow in the channel formation.

23 Claims, 4 Drawing Sheets

TRAINING AND/OR GAMING APPARATUS AND METHOD

FIELD OF THE INVENTION

This invention relates to a training and/or gaming apparatus. This invention also provides a method of training a group of individuals to communicate and cooperate with one another.

BACKGROUND OF THE INVENTION

A challenge that many individuals can face in today's workforce is the ability to communicate and cooperate with other individuals in the same organization or outside of the organization. One method employed to improve communication and cooperation between individuals is the use of experiential learning concepts.

Experiential programs place individuals in environments designed to reflect situations found in, for example, the workplace. The decisions the individuals make during the experience determine the outcome. During debriefing, the individuals' experiences are linked to their real-world situations.

SUMMARY OF THE INVENTION

This invention relates to an apparatus that can provide a group of individuals with an experiential exercise. The exercise can be designed to, for example, but not limited to, aid individuals in forming teams, improving team performance, communication, and planning and implementing projects.

The apparatus of the invention is suitable for use in training exercises, such as experiential exercises, or for gaming. The apparatus can comprise a source of fluid flow and a channel formation, or a network of enclosed channels having at least two branches, connected to the source of fluid flow at at least two regions of the channel formation. The source of fluid flow can be a vacuum suction provided from, for example, a single vacuum source. The fluid flow can be airflow.

The channel formation is adapted to receive at least one projectile therein, and the projectile is displaceable within the channel formation as a result of the fluid flow. The projectile can be, for example, a ball.

A gate is located at each region and is movable between an open position and a closed position. When the gate is in the closed position it at least partially obstructs the fluid flow with the channel formation in that region. Further, at least one fluid flow regulator is provided in the channel formation to adjust the fluid flow in the channel formation.

The fluid flow regulator can be provided in the wall of the channel formation adjacent each of the gates. In particular, the gate can be positioned between the fluid flow regulator and the source of fluid flow.

The fluid flow regulator can be a closeable aperture provided in a wall of the channel formation to open the channel formation to the surrounding environment. For the embodiment disclosed, where fluid flow is airflow as a result of vacuum suction, the surrounding environment is the atmosphere and the opening in the channel formation allows air to enter the channel formation in response to the vacuum suction.

A stop can also be provided within the channel formation to prevent the projectile from passing through the gate. The stop can be provided within the channel formation between the gate and the closable aperture.

The source of fluid flow can be connected to the channel formation through a second channel formation. In particular, each region is a junction between the channel formation and the second channel formation. Moreover, the second channel formation can be connected to each region to form a continuous loop. Further, the channel formation of the apparatus can comprise a plurality of channel formations that are all in fluid communication with each other at one end and which terminate at an opposed end at the junctions with the second channel formation.

The channel formation of the apparatus can be translucent or transparent so that the projectile can be seen as it moves within the channel formation as a result of the fluid flow.

The apparatus of this invention also provides for a method of experiential training of a plurality of individuals. The method comprises providing a group of individuals with a challenge involving moving the projectile within the channel formation between the regions, having each individual assigned to a gate of the apparatus and at least one individual to the fluid flow regulator of the apparatus to control the movement of the projectile within the channel formation according to the challenge, and evaluating the performance of the group of individuals after the completion of the challenge. During this debriefing, the individuals' experiences can be linked to their real-world situations.

BRIEF DESCRIPTION OF THE DRAWINGS

For a better understanding of the present invention and to show more clearly how it would be carried into effect, reference will now be made, by way of example, to the accompanying drawings that show preferred embodiments of the present invention, and in which.

DETAILED DESCRIPTION OF THE INVENTION

Figure 1:
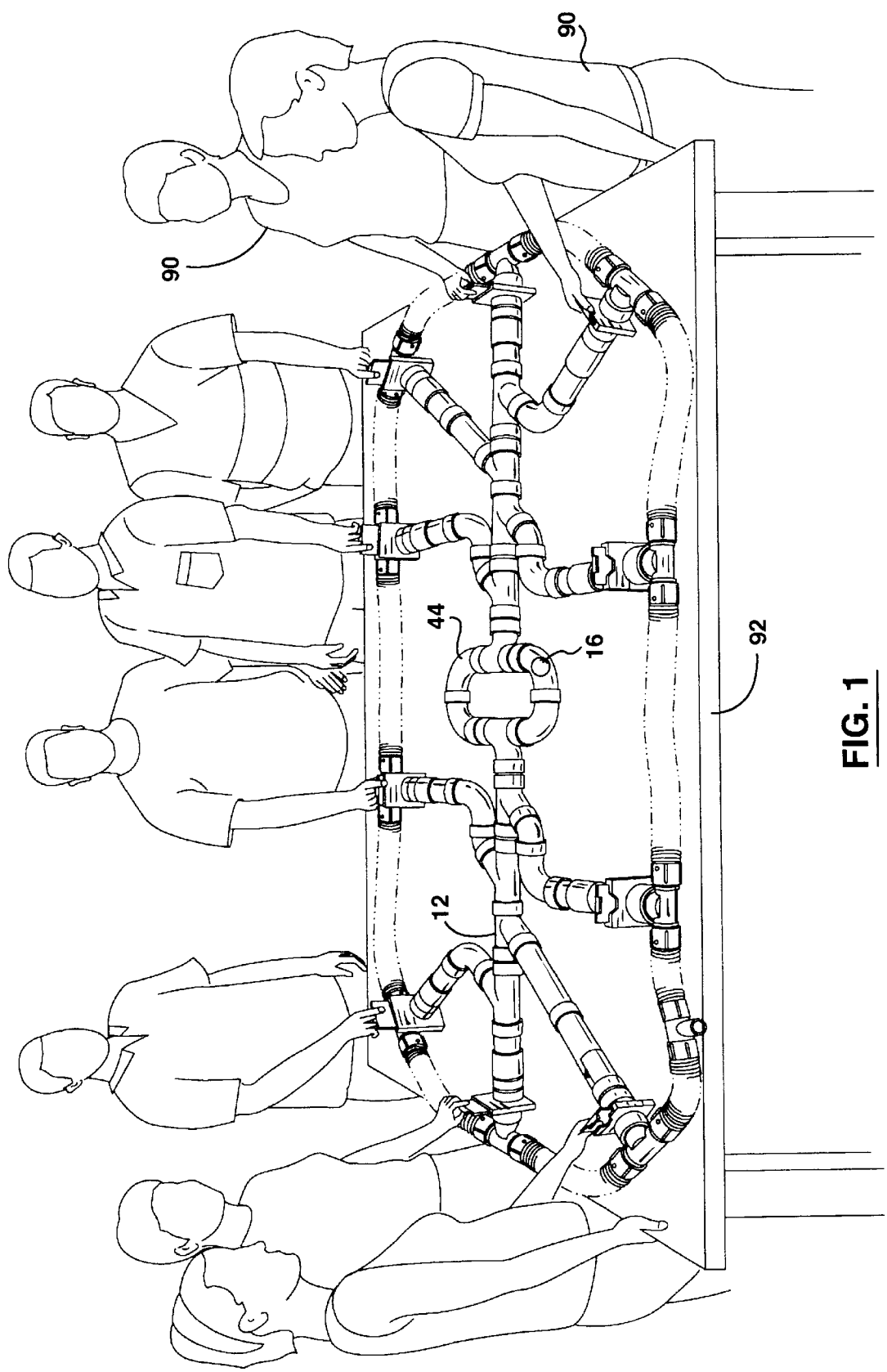
FIG. 1 is a perspective view of the training and/or gaming apparatus in use by a group of individuals.

The present invention relates to an apparatus 10 that is suitable for use in training exercises, such as experiential exercises, or for gaming. The apparatus 10 generally comprises a channel formation 12 that is connected to a source of fluid flow, as will hereinafter be described. The channel formation 12 features an enclosing wall 14 so as to permit fluid flow through the channels. In the embodiment of the apparatus disclosed the fluid flow is airflow and the walls 14 are of a suitable material that is impervious to air, such as, for example, plastic.

The channel formation 12 can be constructed from a plurality of tubular sections interconnected to one another. Each of the tubular sections has an inner diameter that is sufficient to permit a suitable projectile, such as, for example, a ball 16, to be displaced through the channel formation 12. For the embodiment disclosed where the fluid flow is an airflow, the ball 16 can be, for example, a ping-pong ball. Other balls of sufficient weight that can be displaced by air can be used in this invention, however.

Figure 2:
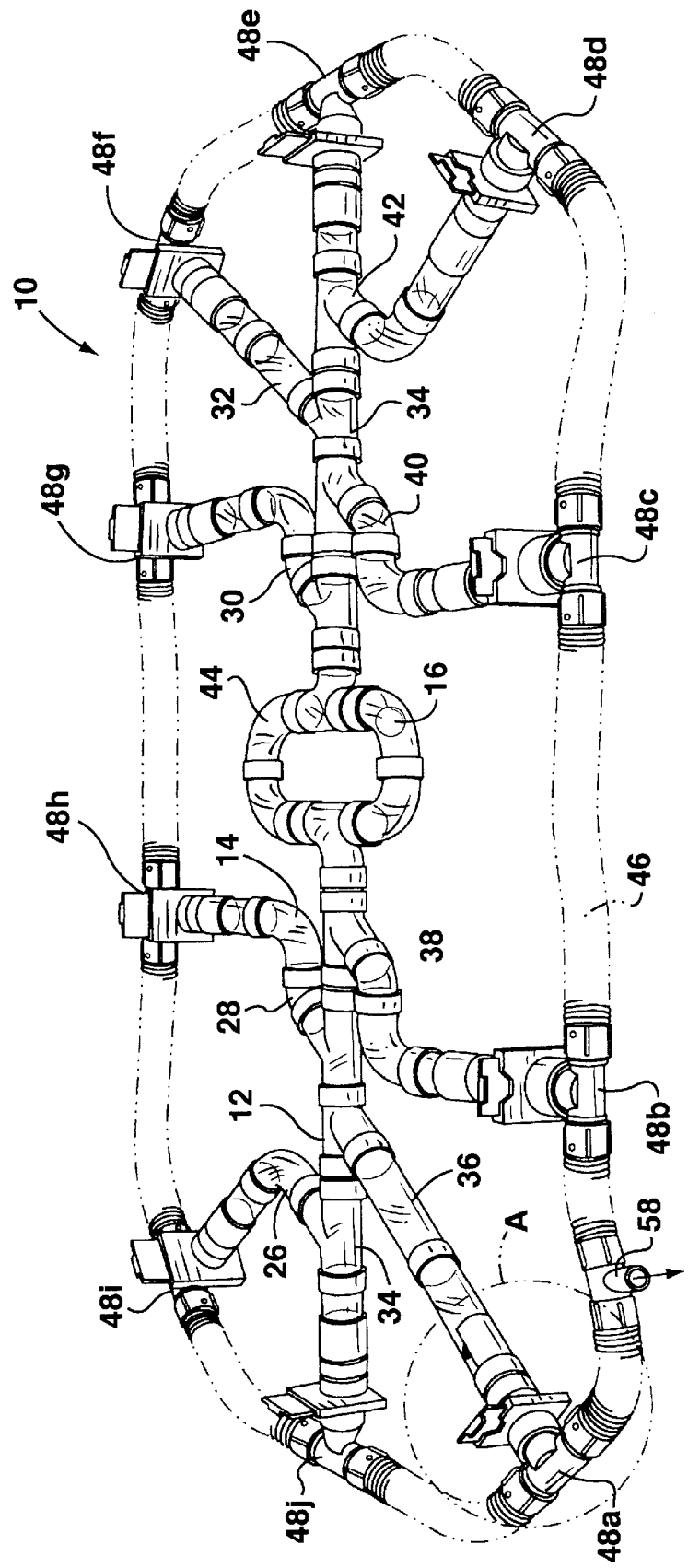
FIG. 2 is a perspective view of the training and/or gaming apparatus.
Figure 4:
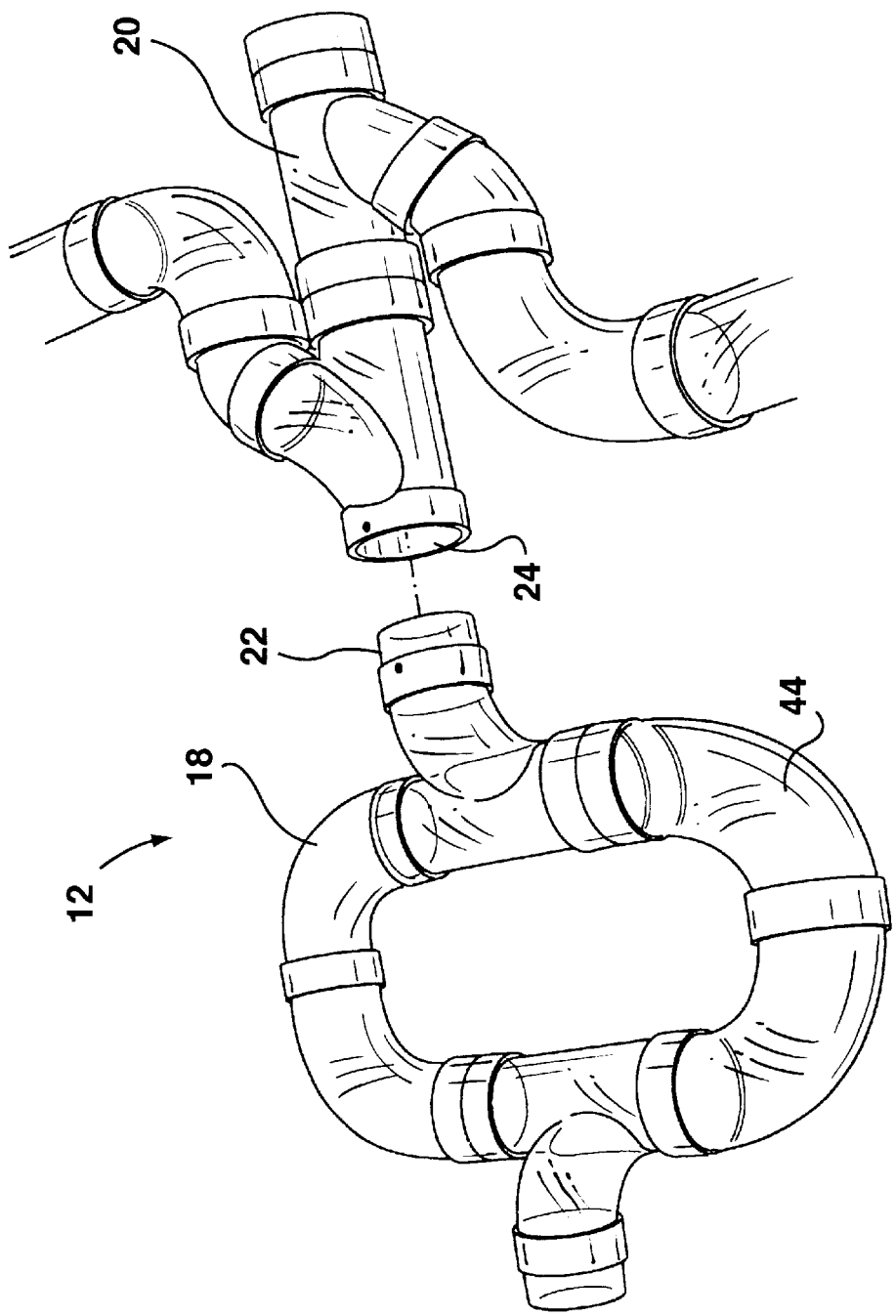
FIG. 4 is an exploded view illustrating one embodiment of how adjacent segments of the channel formation of the apparatus of the invention can be interconnected.

Referring to FIGS. 2 and 4 the interconnection of the various tubular sections to form the channel formation 12 is shown. In particular, referring to FIG. 4, a section 18 of the channel formation 12 is shown being interconnected to a section 20 of the channel formation 12. The sections 18 and 20 are interconnected through a male 22 and a female 24 coupling that retains the sections 18 and 20 together in a suitable interference or friction fit. It can be appreciated that the fit between the male component 22 and the female component 24 should be sufficient to prevent air within the channel formation 12 from escaping through the coupling. If necessary a ring clamp (not illustrated) can be provided to ensure that the coupling between the sections of the channel formation is airtight.

As illustrated in FIG. 2, the channel formation 12 comprises a plurality of channel formations that branch out from one another at various angles. For the embodiment disclosed branches 26, 28, 30, and 32 of the channel formation 12 branch out from a central portion 34 of the channel formation 12 from the same side but not necessarily at the same angle to the central portion 34 of the channel formation 12. In a similar manner, branches 36, 38, 40, and 42 extend from the central portion 34 of the channel formation 12 from the same side but not necessarily at the same angle to the central portion 34 of the channel formation 12. As illustrated in FIG. 2 the angle of the respective branches 26, 28, 30, 32, and 36, 38, 40, and 42 are non-right angles with respect to the central portion 34 of the channel formation 12. Moreover, for the embodiment disclosed, branches 26, 28, 30, and 32 are an inverse mirror image of branches 36, 38, 40, and 42. Note that other configurations of the branches of the channel formation 12 can be provided, and that the embodiment described is for purposes of illustration only.

As illustrated in FIGS. 2 and 4, the section 18 of the channel formation 12 forms a loop 44 that can be provided centrally in the channel formation 12. Loop 44 provides a continuous loop through which ball 16 can be navigated by the airflow, as will hereinafter be described.

The various sections of channel formation 12 can be translucent or transparent so that the ball 16 can be seen as it moves or is displaced within the channel formation as a result of the airflow.

A second channel formation 46 is provided to connect channel formation 12 to the source of airflow. In particular, the second channel formation 46 is connected to channel formation 12 at at least two regions of the channel formation 12, and, for the embodiment illustrated in FIG. 2, is connected to second channel formation 46 at ten regions, namely, 48a, 48b, 48c, 48d, 48e, 48f, 48g, 48h, 48i, and 48j. In particular each region 48a, 48b, 48c, 48d, 48e, 48f, 48g, 48h, 48i, and 48j is a junction between the channel formation 12 and the second channel formation 46. As illustrated second channel formation 46 is connected to each region in series to form a continuous loop.

The second channel formation 46 can comprise a plurality of sections that are interconnected to one another by having each end coupled at the junction to a suitable connector 50 (see FIGS. 3A and 3B) at either side, 52 and 54, using a suitable coupling mechanism, such as, for example, a friction or interference fit, or a threaded screw connection. Connector 50 is, in turn, connected as at 56 to the respective ends of the branches 26, 28, 30, 32, and 36, 38, 40, 42, and central portion 34, of the channel formation 12 through use of a suitable coupling mechanism such as, for example, a friction or interference fit or a threaded screw coupling.

Referring to FIG. 2, second channel formation 46 is connected to a suitable source for the airflow, such as, for example, vacuum suction (not illustrated) as at 58. In can be appreciated, however, that the source of fluid flow could either blow fluid into the second channel formation 46 or suck fluid out of the channel formation 46.

Figure 3A:
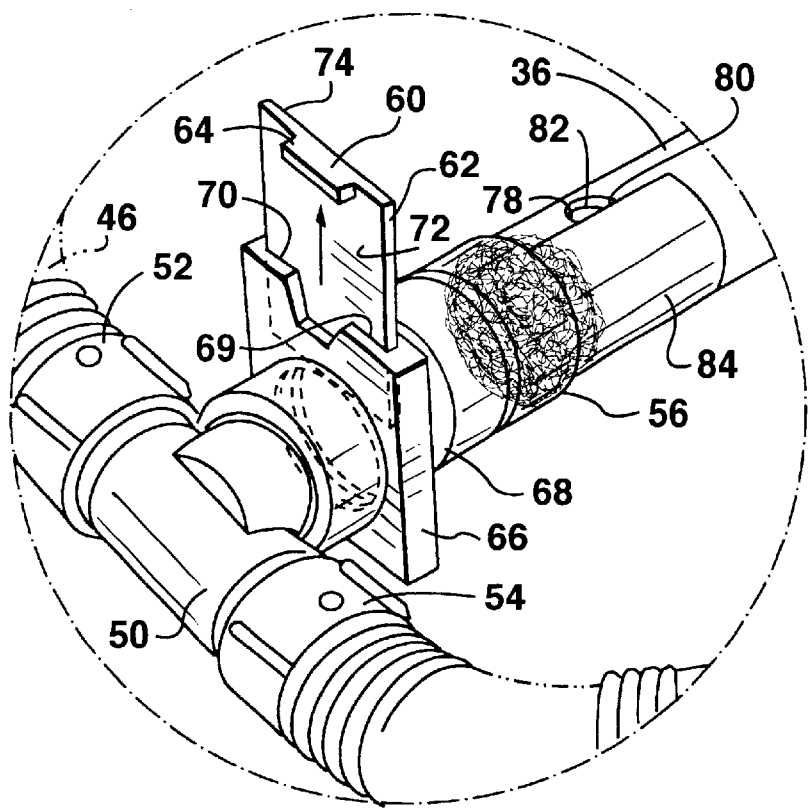
FIG. 3A is an enlarged view of portion A as shown in FIG. 2 illustrating the gate and fluid flow regulator, with the gate in an open position.
Figure 3B:
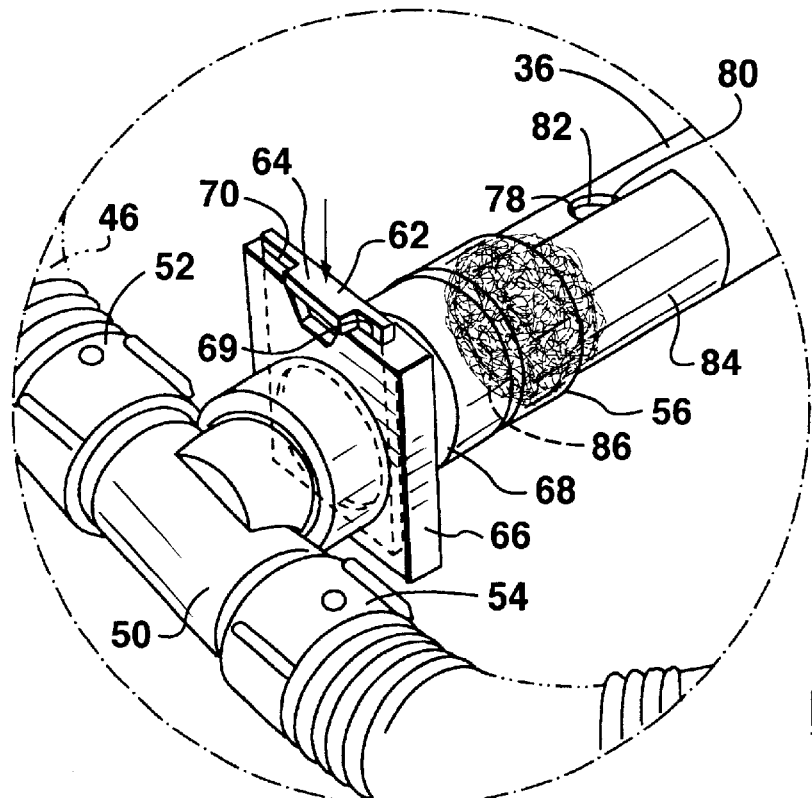
FIG. 3B is a figure similar to 3A, but with the gate shown in a closed position.

Referring to FIGS. 3A and 3B a gate 60 is shown for obstructing the fluid flow in the channel formation 12, as will hereinafter be described. In the embodiment illustrated the gate 60 comprises a plate 62 movable between an open position (as illustrated in FIG. 3A) and a closed position (illustrated in FIG. 3B). A handle 64 is provided in the upper portion of the plate 62 to facilitate gripping of the plate by the hand of an individual (as illustrated in FIG. 1). The plate 62 is slideably disposed within the channel formation to at least partially obstruct the airflow when in the closed position. In particular, the plate 62 is slideably disposed within the channel formation to intersect the airflow as the plate moves from the open position as shown in FIG. 3A to the closed position as shown in FIG. 3B. Moreover, the extent of the plate 62 is such that when in the closed position as illustrated in FIG. 3B it fully obstructs the airflow within the channel formation 12. A guide formation 66 is provided by a segment 68 of the connector 50 to slideably retain the plate 62 therein. In particular, guide formation 66 is provided with channels 69, 70 within which the side edges 72, 74, respectively, of plate 62 are slideably received. It can be appreciated that to prevent any leakage of the airflow when the gate 60 is in the closed position, it is desirable that the plate 62 and the channel formations 69, 70 of the guide formation 66 are provided with a suitable gasket or sealing member (not illustrated).

In addition to the gate, each channel formation is provided with a fluid flow regulator 78. For the embodiment illustrated, the fluid flow regulator 78 is provided in a region adjacent the gate 60. The fluid flow regulator 78 comprises, for the embodiment illustrated, a closeable aperture 80 that comprises an opening 82 provided in the wall 14 of the channel formation 12, as well as a panel member 84 that is slideably displaceable over the wall 14 of the channel formation 12 to fully close the opening 82. The panel member can be slideably secured to the wall 14 of the channel formation by any suitable means. It can be appreciated, however, that to prevent any leakage of the airflow through the closeable aperture, when in the closed position, a suitable gasket or sealing member (not illustrated) can be provided between the panel member 84 and the wall 14 of the channel formation 12.

A stop 86 can be provided within connector 50 to prevent the ball 16 from passing through the gate 60. The stop can be a wire mesh or a wire ball suitably secured within the connector 50 to block the channel formation. The wire mesh is to be sufficiently porous, however, to allow fluid flow therethrough (which for the embodiment disclosed is airflow).

In operation, the ball is displaced through the channel formation 12 by the airflow as follows. If all of the gates were consistently open or closed the airflow within the channel formation would generally be equal from all directions and the ball 16 would not move within the channel formation. For purposes of this discussion it is assumed that the source of airflow is a vacuum suction and that all of the gates start in a closed position. If the ball is placed somewhere in the central channel portion 34 of the channel formation and it is desired to move it to a given region or junction, for example, region 48a, then the gate for that region must be opened. In addition, the fluid flow regulator 78 closest to the ball 16 must be opened (that is the panel 84 is displaced to expose the opening 82). This allows air from outside the channel formation 12 to enter the channel formation 12 causing the airflow to push the ball 16 from behind to the region where the gate is opened (i.e., the vacuum suction is greatest). Although this example is simplified, it illustrates the basic mechanics of the invention. Complex movement of the ball can be contemplated through opening various gates and fluid flow regulators. For example, as illustrated in FIG. 2, the ball can be moved so that it navigates around the loop 44 provided within the channel formation 12.

FIG. 1 shows an example of the apparatus of this invention in use by a plurality of individuals 90. The apparatus can be set up on a suitable table 92 so as to be at an appropriate height for ease of use. For purposes of use as a game or a training apparatus the various regions or junctions can be overlaid with a marking of, for example, a fanciful place name. Alternatively, the table can provide this information. Various challenges can be provided to the individuals, such as, for example, moving the ball from one region or junction to another region or junction (i.e., from one place name to another). A grading system for the challenge can be assigned. Each individual can be assigned to a gate 60 of the apparatus and, for the embodiment illustrated, to a fluid flow regulator 78 of the apparatus. This allows the individuals to control the movement of the projectile within the channel formation. The individuals then try to complete the challenge and the result is evaluated. For experiential programs, the challenges of moving the ball through various patterns within the channel formation 12 can be designed to reflect situations found in, for example, the workplace. The decisions the individuals make during the experience determine the outcome. During debriefing, the individuals' experiences can be linked to their real-world situations.

The challenges can be designed to, for example, but not limited to, aid individuals 90 in forming teams, improving the team performance, communication, and planning and implementing projects (which for the apparatus 10 can be completing the various challenges). For example, a challenge might be moving a ball from one region to another. The individuals 90 cooperate to set the various gates and fluid flow regulators to achieve the desired results with the source of vacuum suction turned off. Once the desired opening and closing of the various gates and fluid flow regulators has been worked out, the vacuum suction is turned on and the path the ball takes within the channel formation 12 noted. Team communication is necessary for a successful outcome of such a challenge.

It can be appreciated that variations to this invention would be readily apparent to those skilled in the art, and this invention is intended to include those alternatives.

What is claimed is:

1. A training and/or gaming apparatus comprising:
   a) a source of fluid flow;
   b) at least one projectile;
   c) a network of enclosed channels, the network comprising at least two branches, the at least two branches each having a first end in fluid communication with the source of fluid flow, and a second end in further fluid communication with at least one other branch, the channels shaped so as to accommodate the at least one projectile therein, so that the projectile is displaced within the network of channels by the fluid flow;
   d) a gate located proximate to the first end of each branch and movable between an open position and a closed position, so that the gate in the closed position at least partially obstructs the fluid flow between the source of fluid flow and the branch;
   e) at least one fluid flow regulator provided in the network of enclosed channels to adjust the fluid flow in the channel formation; and
   f) a stop to consistently prevent the at least one projectile from reaching the gate.

2. A training and/or gaming apparatus according to claim 1, wherein the fluid flow regulator is provided in the walls of the enclosed channels adjacent each of the gates.

3. A training and/or gaming apparatus according to claim 2, wherein the gate is positioned between the fluid flow regulator and the source of fluid flow.

4. A training and/or gaming apparatus according to claim 3, wherein the gate comprises a plate slideably disposed within the enclosed channels to intersect the fluid flow, the plate having a sufficient extent to obstruct the enclosed channel when the plate is in the closed position.

5. A training and/or gaming apparatus according to claim 4, wherein the channel formation is provided with a guide formation within which the plate is slideably disposed.

6. A training and/or gaming apparatus according to claim 5, wherein the extent of the gate is sufficient to completely obstruct the enclosed channel when the gate is in the closed position.

7. A training and/or gaming apparatus according to claim 3, wherein the fluid flow regulator is a closeable aperture provided in a wall of at least one enclosed channel to open the channel to the surrounding environment.

8. A training and/or gaming apparatus according to claim 7, wherein the closeable aperture comprises an opening provided in the wall of the enclosed channel and a panel member adapted to slide over the opening to fully close the opening.

9. A training and/or gaming apparatus according to claim 3, further comprising additional enclosed channels connecting the first end of each branch in fluid communication with the first end of each adjacent branch, at least one of the additional enclosed channels being in further fluid communication with the source of fluid flow.

10. A training and/or gaming apparatus according to claim 9, wherein the first end of each branch forms a junction between that branch and the additional enclosed channels, the junction connecting the first end of that branch to the first end of each adjacent branch.

11. A training and/or gaming apparatus according to claim 10, wherein the additional enclosed channels are connected between each junction to form a continuous loop.

12. A training and/or gaming apparatus according to claim 11, wherein the network of enclosed channels comprises a plurality of enclosed channels that are all in fluid communication with each other at one end thereof and that terminate at an opposed end at the junctions with the additional enclosed channels.

13. A training and/or gaming apparatus according to claim 12, wherein the source of fluid flow is a vacuum suction.

14. A training and/or gaming apparatus according to claim 13, wherein the source of fluid flow is a single source.

15. A training and/or gaming apparatus according to claim 14, wherein the fluid flow is airflow.

16. A training and/or gaming apparatus according to claim 15, wherein the projectile is a ball.

17. A training and/or gaming apparatus according to claim 16, wherein the network of enclosed channels is translucent.

18. A training and/or gaming apparatus according to claim 16, wherein the network of enclosed channels is transparent.

19. A training and/or gaming apparatus according to claim 1, wherein the stop is provided within the enclosed channel between the gate and the closable aperture.

20. A training and/or gaming apparatus according to claim 19, wherein the stop is a wire mesh.

21. A training and/or gaming apparatus according to claim 19, wherein the stop is a wire ball.

22. A training and/or gaming apparatus comprising:
   a) a source of fluid flow;
   b) at least one projectile;
   c) a network of enclosed channels, the network comprising at least two branches, the at least two branches each having a first end in fluid communication with the source of fluid flow, and a second end in further fluid communication with at least one other branch, the channels shaped so as to accommodate the at least one projectile therein, so that the projectile is displaced within the network of channels by the fluid flow;
   d) a gate located proximate to the first end of each branch and movable between an open position and a closed position, so that the gate in the closed position at least partially obstructs the fluid flow between the source of fluid flow and the branch;
   e) at least one fluid flow regulator provided in the network of enclosed channels to adjust the fluid flow in the channel formation; and
   f) stop to prevent the projectile from passing through the gate, and wherein
      i) the fluid flow regulator is provided in the walls of the enclosed channels adjacent each of the gates;
      ii) the gate is positioned between the fluid flow regulator and the source of fluid flow; and
      iii) the stop is a wire mesh provided within the enclosed channel between the gate and the closable aperture.

23. A training and/or gaming apparatus comprising:
   a) a source of fluid flow;
   b) at least one projectile;
   a) a network of enclosed channels, the network comprising at least two branches, the at least two branches each having a first end in fluid communication with the source of fluid flow, and a second end in further fluid communication with at least one other branch, the channels shaped so as to accommodate the at least one projectile therein, so that the projectile is displaced within the network of channels by the fluid flow;
   d) a gate located proximate to the first end of each branch and movable between an open position and a closed position, so that the gate in the closed position at least partially obstructs the fluid flow between the source of fluid flow and the branch;
   e) at least one fluid flow regulator provided in the network of enclosed channels to adjust the fluid flow in the channel formation; and
   f) a stop to prevent the projectile from passing through the gate, and wherein
      i) the fluid flow regulator is provided in the walls of the enclosed channels adjacent each of the gates;
      ii) the gate is positioned between the fluid flow regulator and the source of fluid flow; and
      iii) the stop is a wire ball that is provided within the enclosed channel between the gate and the closable aperture.

* * * * *